（12） United States Patent
Tanaka et al.

(10) Patent No.: US 6,435,317 B2
(45) Date of Patent: Aug. 20, 2002

(54) BRAKE CABLE-CONNECTING APPARATUS FOR DRUM BRAKE

(75) Inventors: Takao Tanaka, Aichi-ken; Katsuhisa Kurihara, Nagoya, both of (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/905,988

(22) Filed: Jul. 17, 2001

(51) Int. Cl.[7] .................................................. B60T 1/00
(52) U.S. Cl. .................. 188/2 D; 74/502.6; 188/106 F
(58) Field of Search ....................... 188/74, 2 D, 106 A, 188/106 F, 78, 325; 74/502.6, 500.5, 79.51–79.55

(56) References Cited

U.S. PATENT DOCUMENTS 6,325,183 B2 * 12/2001 Kurihara ...................... 188/78

* cited by examiner

Primary Examiner—Douglas C. Butler
(74) Attorney, Agent, or Firm—Liniak, Berenato, Longacre & White

(57) ABSTRACT

A brake-actuating mechanism comprises a strut; an operating lever relatively pivoted with respect to the strut about a pivot pin, a brake cable including a cable end engaging with the lever and a resilient member provided to obstruct a cable end engagement recess of the operating lever. A brake cable-connecting apparatus of the brake-actuating mechanism designed to avoid a disengagement of the cable end from the lever without damaging or deforming the cable end and/or the lever. The resilient member deforms thoroughly allowing the cable end to go toward the cable end engagement recess when the brake cable is installed in the operating lever and avoids the cable end disengaging from the engagement recess while transporting a drum brake device with the brake cable.

14 Claims, 14 Drawing Sheets

(a)

(b)

(a)

(b)

(a)

(b)

(a)

(b)

(a)

(b)

(a)

(b)

(a)

(b)

BRAKE CABLE-CONNECTING APPARATUS FOR DRUM BRAKE

FIELD OF THE INVENTION

This invention relates to a brake-actuating mechanism for use on a drum brake device, designed to mechanically move a pair of brake shoes away from each other in response to operation of an operating lever. More particularly, it relates to a brake cable-connecting apparatus designed to permit a brake cable to remain connected on the operating lever, even during transportation of the drum brake device.

DESCRIPTION OF THE RELATED ART

One known type of a prior art brake cable-connecting apparatus of a brake-actuating mechanism as described above is illustrated in FIGS. 14a and 14b, disclosed in Japanese Patent Application Laid-Open No. 2000-108855.

In FIGS. 14a and 14b, a strut, an operating lever and a brake cable are identified by reference numerals 1, 2 and 3, respectively. As described below, these components comprise a drum brake-actuating mechanism in cooperation.

A brake shoe engagement groove 1a is formed at one end of the strut 1, with which one brake shoe (not shown) is engaged. The operating lever 2 is pivotably supported on the strut 1 in a state in which a proximal end of the lever 2 is pivoted about the other end of the strut 1 by means of a pivot pin 4. A brake shoe engagement groove 2a is formed at the proximal end of the operating lever 2, with which the other brake shoe (not shown) is engaged.

As illustrated in FIG. 14b, a cable end engagement recess 2b is formed at a free end of the lever 2, with which a cable end 3a of the brake cable 3 is engaged in a brake cable pulling direction, or rather in a cable operating direction.

In the above structure, when a cable-pulling force indicated by arrow "W" is actuated on the operating lever 2 via the brake cable 3, then the operating lever 2 rotates about the pin 4 in a corresponding direction, thereby thrusting the corresponding brake shoe in a leftward direction of FIG. 14b.

Such rotational movement of the lever 2 imparts a counterforce to the strut 1, thereby pushing the strut 1 together with the corresponding brake shoe in a rightward direction of FIG. 14b.

The action of the brake shoes away from each other causes the brake shoes to be pressed against an inner circumferential surface of a brake drum (not shown), thereby providing a predetermined braking action.

In order to engage the cable end 3a with the cable end engagement recess 2b at the free end of the lever 2, the brake cable 3 (cable end 3a) is initially inserted into the brake-actuating mechanism as shown by arrows in FIG. 14a, and then the cable end 3a is positioned above the cable end engagement recess 2b. The brake cable 3 is pulled in the operating direction as shown by arrows in FIG. 14b, thereby engaging the cable end 3a with the cable end engagement recess 2b.

The drum brake device is sometimes transported in a state that the brake cable 3 (the cable end 3a) is installed to the operating lever 2. In this case, easy disengagement of the brake cable 3 (the cable end 3a) from the operating lever 2 significantly reduces operability.

As disclosed in the above-described prior art, conventional practice to prevent such disengagement is that the width of an opening of the cable end engagement recess 2b is made smaller than a diameter of the cable end 3a so that a great pulling force must be actuated on the brake cable 3 at the final step as shown by the arrow in FIG. 14b in order to insert the cable end 3a into the brake cable engagement recess 2b. Such a proposal has been made to provide a countermeasure to avoid disengaging the brake cable 3 (the cable end 3a) from the operating lever 2 during transportation of the drum brake device.

However, such a conventional countermeasure impairs operability because the cable end 3a must be inserted into the brake cable engagement recess 2b with the great force. This means that cable-connecting operability is sacrificed for engagement of the cable end with the brake cable engagement recess 2b, and this is an impractical method.

Since the end 3a is forcedly inserted into the brake cable engagement recess 2b by the great force, the end 3a and the opening of the brake cable engagement recess 2b may be damaged or deformed. This is an impractical method as well.

SUMMARY OF THE INVENTION

According to a first aspect of the present invention, an object of the invention is to obviate the above problem by means of another countermeasure that substantially differs in idea from the above-described prior art, and further to provide an improved brake cable-connecting apparatus designed to engage a cable end of the brake cable in positive engagement with a cable end engagement recess of an operating lever at a free end thereof, with little increase in effort required for engaging the cable end with the cable end engagement recess, without a sacrifice of cable-connecting operability, and without damage or deformation of the cable end and the opening of cable end engagement recess.

In order to accomplish this object, in the first aspect, a brake cable-connecting apparatus of a brake-actuating mechanism for use on a drum brake, the brake actuating mechanism comprises: a strut engaging with one of a pair of brake shoes at one end thereof; an operating lever, being pivotably attached to the strut at the other end of the strut, engaging with the other of the brake shoes at the other end thereof; a brake cable, a cable end thereof engaging with a free end of the operating lever in a cable operating direction so as to rotate the operating lever relative to the strut with a pivotal attachment portion by applying a brake cable-pulling force on the free end of the operating lever, thereby moving the brake shoes in a direction away from each other. Notably, a resilient member is extending into a path in which the cable end moves when the cable end engages with the free end of the operating lever and is positioned to interfere with the cable end so that the cable end can pass over the resilient member with sufficiently resiliently. The resilient member is deformed by the cable end when the cable end moves in the path in the cable operating direction, while the cable end can not pass over the resilient member when the cable end moves in the path in a cable releasing direction substantially opposite to said cable operating direction.

When the brake cable-pulling force is imposed on the free end of the operating lever via the cable end, then the operating lever and strut are relatively pivoted with respect to each other about the pivotal attachment portion, thereby moving the brake shoes away from each other. In engaging the cable end with the fee end of the operating lever, a brake cable is pulled by light force, and the cable end is thereby held against the free end of the operating lever.

According to the first aspect of the invention, the use of the resilient member makes it feasible to engage the cable end in positive engagement with a cable end engagement portion of the operating lever at the free end thereof, with little increase in effort required for holding the cable end in engagement with the free end of the operating lever, without a sacrifice of cable-connecting operability, and without damage or deformation of the cable end and the cable end engagement portion.

According to a second aspect of the present invention, an object of the invention is to provide an improved brake cable-connecting apparatus wherein the operation and effects according to the first aspect of the invention are achievable by means of a low cost countermeasure including a plate spring.

In the second aspect of a brake cable-connecting apparatus as defined in the first aspect of the invention, the resilient member is formed by a plate spring disposed so as to be resiliently deformed in a thickness direction of the plate spring by the cable end when the cable end runs in the path in the operating and releasing directions. For the second aspect, the resilient deformation in the cable operating direction is designed to allow the movement of the cable end through the path in the cable operating direction and to restrict the movement in the cable releasing direction.

Pursuant to the second aspect of the invention, the operation and effects as provided in the first aspect of the invention is achievable by means of a low cost countermeasure including the plate spring.

According to a third aspect of the present invention, an object of the invention is to provide an improved brake cable-connecting apparatus designed to allow the plate spring according to the second aspect of the invention to be simply disposed therein at low cost.

In the third aspect of a brake cable-connecting apparatus as defined in the second aspect of the invention, the plate spring is supportingly mounted on a pivot pin used to pivotably attach the operating lever to the strut at the other end of the strut.

Pursuant to the third aspect of the invention, it is advantageous in that the plate spring according to the second aspect of the invention can simply be disposed in the brake cable-connecting apparatus at low cost.

According to a fourth aspect of the invention, an object of the invention is to provide an improved brake cable-connecting apparatus designed to provide the operation and effects according to the first aspect of the invention at lower cost.

The fourth aspect of the invention provides a brake cable-connecting apparatus as defined in the third aspect of the invention, wherein the strut includes a pair of opposed sidewalls and a bridge portion that spans between the sidewalls. The free end of the operating lever is interposed between the sidewalls at both sides of the operating lever in a pivotal axial direction of the operating lever, and the resilient deformation of the plate spring is defined by the bridge portion and is designed to restrict the movement of the cable end in the path in the cable releasing direction over resilient member.

Pursuant to the fourth aspect of the invention, the operation and effects according to the first aspect of the invention are achievable at lower cost because the starting point of the resilient deformation of the plate spring is defined by one part of the strut when the cable end moves in the path in the cable releasing direction.

According to a fifth aspect of the invention, an object of the invention is to provide an improved brake cable-connecting apparatus designed to provide the operation and effects according to the first aspect of the invention at further lower cost.

In the fifth aspect of a brake cable-connecting apparatus as defined in the third or fourth aspect of the invention, the free end of the operating lever is formed into a forked leg with which at least one end of the cable end engages in the pivotal axial direction of the operating lever, and wherein the starting point of the resilient deformation of the plate spring where the cable end can run in the path in the operating direction over resilient member is decided by a proximal portion of the forked leg.

Pursuant to the fifth aspect of the invention, the operation and effects according to the first aspect of the invention are achievable at further lower cost because the starting point of the resilient deformation of the plate spring is defined by one part of the operating lever when the cable end moves in the path in the cable operating direction.

According to a sixth aspect of the invention, an object of the invention is to provide an improved brake cable-connecting apparatus designed to provide the operation and effects according to the first aspect of the invention by means of a low cost countermeasure including a plate spring that differs from the plate spring according to the second aspect of the invention.

In the sixth aspect of a brake cable-connecting apparatus as defined in the first aspect of the invention, the resilient member is formed by a plate spring disposed to permit the cable end to pass over the resilient member by sufficiently resilient deformation in a thickness direction of the plate spring by the cable end when the cable end moves in the path in the cable operating direction[00ab] However, in the sixth aspect, the system is not able to resiliently deform the resilient member due to a force from the cable end in the transverse direction of the plate spring when the cable end moves in the path in the cable releasing direction.

Pursuant to the sixth aspect of the invention, since the plate spring cannot resiliently deform when the cable end moves in the cable releasing direction, a low cost countermeasure formed by the plate spring is able to hold the cable end in engagement with the free end of the operating lever.

When the cable end is moving in the path in the cable operating direction, it is possible that the cable end passes over the plate spring while resiliently deforming the plate spring in the thickness direction of the plate spring, the above-described operation and effects are achievable. For example, it is possible to achieve the disengagement of the cable end from the cable end engagement portion of the operating lever at the free end thereof, with little increase in effort required for engaging the cable end with the free end of the operating lever, without a sacrifice of cable-connecting operability, and without damage or deformation of the cable end and the cable end engagement portion.

According to a seventh aspect of the invention, an object of the invention is to provide an improved brake cable-connecting apparatus designed to reliably provide the operation and effects according to the sixth aspect of the invention by means of a pair of plate springs.

In the seventh aspect of a brake cable-connecting apparatus as defined in the sixth aspect of the invention, a pair of plate springs fixedly attached to the operating lever in such a manner that planar surfaces of the plate springs are positioned parallel to a pivotal surface of the operating lever, respective bent portions being provided at free ends of the plate springs. The bent portions are pushed away from each other by corresponding end surfaces of the cable end in the pivotal axial direction of the operating lever when the cable end moves in the path in the cable operating direction, thereby resiliently deforming the plate springs in the thickness direction of the plate springs, while at least one end of the cable end in the pivotal axial direction of the operating lever abuts against tips of the bent portions so as to cause forces acting in the transverse direction of the plate springs to be actuated on the plate springs when the cable end moves in the path in the cable releasing direction, thereby precluding resilient deformation of the plate springs.

Pursuant to the seventh aspect of the invention, the pair of plate springs holds the cable end in position at both ends of the cable end, and the operation and effects according to the sixth aspect of the invention are reliably provided.

According to an eighth aspect of the invention, an object of the invention is to provide an improved brake cable-connecting apparatus designed for easier installation of the pair of plate springs according to the seventh aspect of the invention.

In the eighth aspect of a brake cable-connecting apparatus as defined in the seventh aspect of the invention, the plate springs are integrally formed with a connecting portion and mounted on the operating lever at the connecting portion.

Pursuant to the eighth aspect of the invention, the plate springs can easily be disposed in the brake cable-connecting apparatus when such a pair of plate spring is used as a plate spring as practiced in the seventh aspect of the invention.

BRIEF DESCRIPTION OF THE DRAWINGS

FIG. 4a is a plan view illustrating the progress of the connecting the brake cable to the brake-actuating mechanism in the situation that the brake cable is inserted;

FIG. 4b is a longitudinal sectional view of FIG. 4a;

FIG. 5a is a plan view illustrating the progress of the routing the brake cable to the brake-actuating mechanism in the situation that the brake cable is rotated 90 degrees;

FIG. 5b is a longitudinal sectional view of FIG. 5a;

FIG. 6a is a plan view illustrating the progress of the connecting the brake cable to the brake-actuating mechanism in the situation that the brake cable is pulled following the situation as shown in FIG. 5;

FIG. 6b is a longitudinal sectional view of FIG. 6a;

FIG. 10a is a plan view illustrating a plate spring unit disposed in the brake-actuating mechanism in the second embodiment;

FIG. 10b is a longitudinal sectional view of FIG. 10a;

FIG. 10c is a left side view of FIG. 10a;

FIG. 11a is a plan view illustrating the progress of the connecting the brake cable to the brake-actuating mechanism in the situation that the brake cable is inserted;

FIG. 11b is a longitudinal sectional view of the FIG. 11a;

FIG. 12a is a plan view illustrating the progress of the connecting the brake cable to the brake-actuating mechanism in the situation that the brake cable insertion is just finished;

FIG. 12b is a longitudinal sectional view of FIG. 12a;

FIG. 13a is a plan view illustrating the progress of the connecting the brake cable to the brake-actuating mechanism in the situation that the brake cable is pulled following the situation as shown in FIG. 12;

FIG. 13b is a sectional view of FIG. 13a;

DESCRIPTION OF THE PREFERRED EMBODIMENTS

Embodiments of the present invention will now be described in detail with reference to the drawings.

Figure 1:
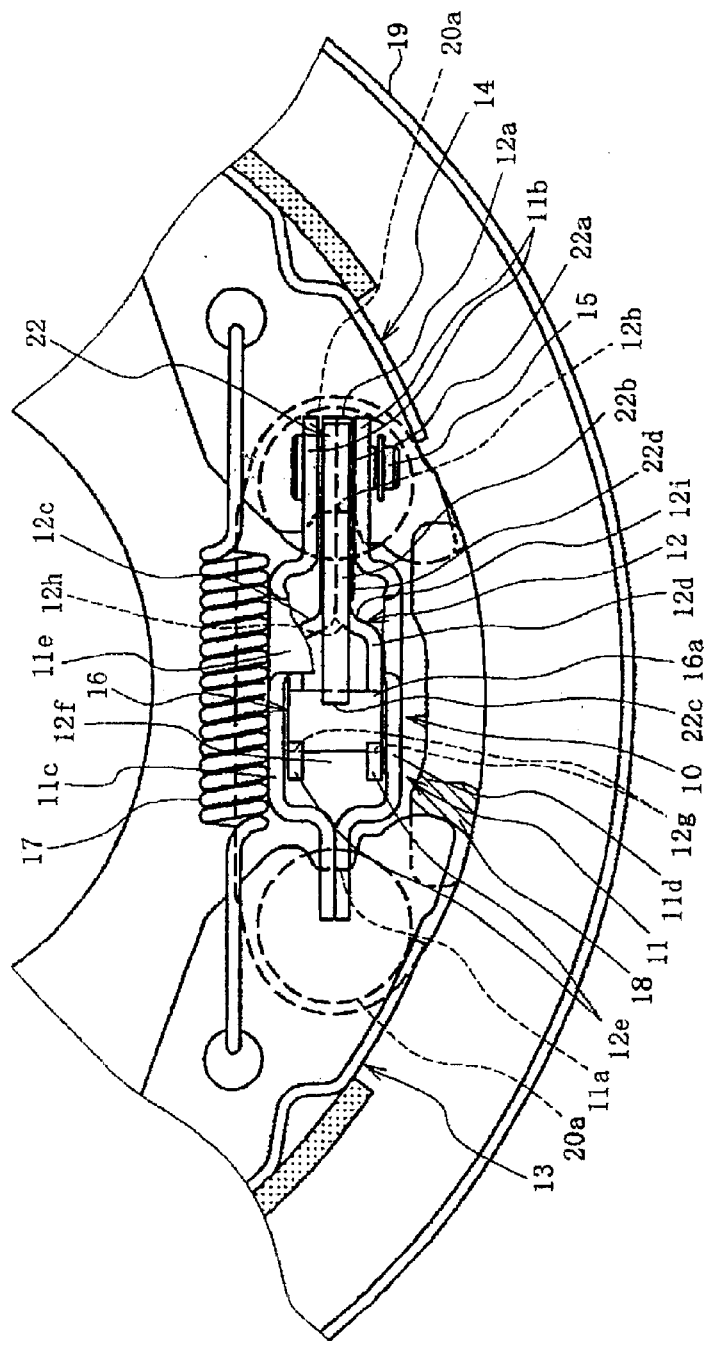
FIG. 1 is a plan view illustrating an essential part of a drum brake device including a brake cable-connecting apparatus of a brake-actuating mechanism according to first embodiment of the present invention.
Figure 2:
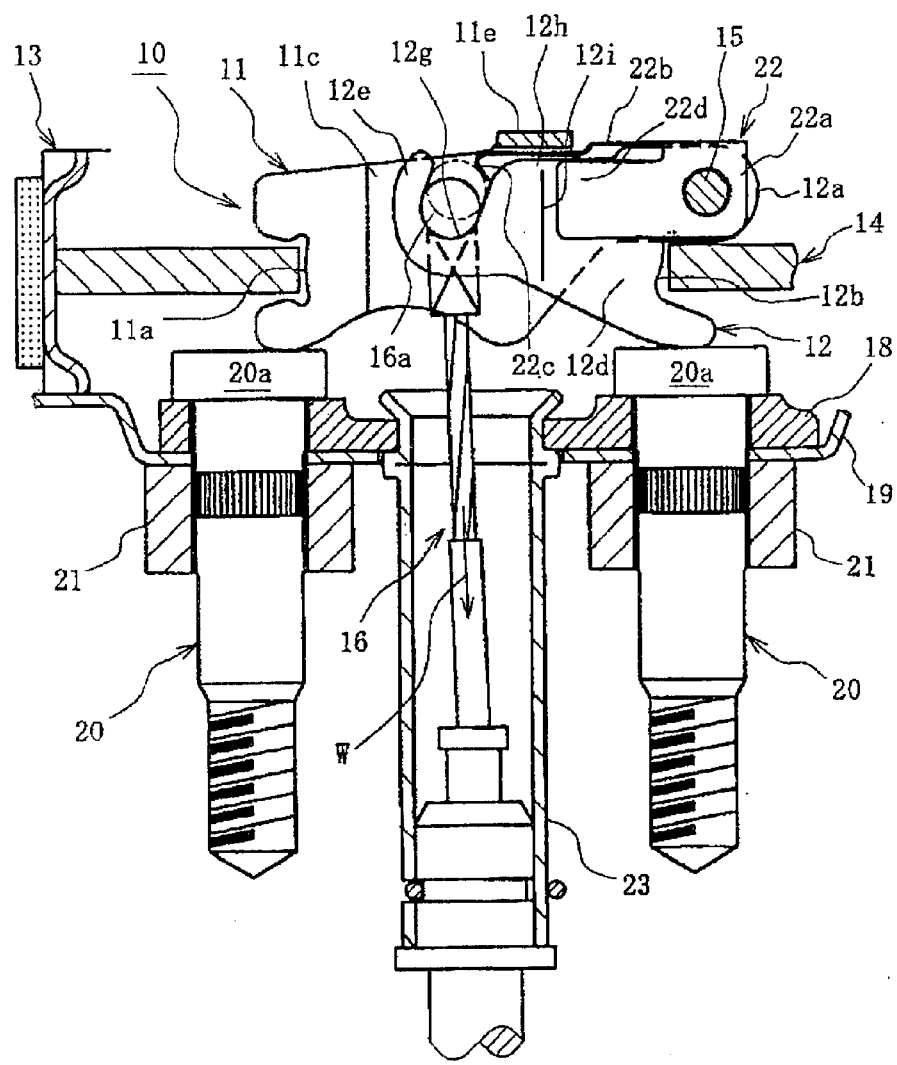
FIG. 2 is a longitudinal sectional view of FIG. 1.
Figure 3:
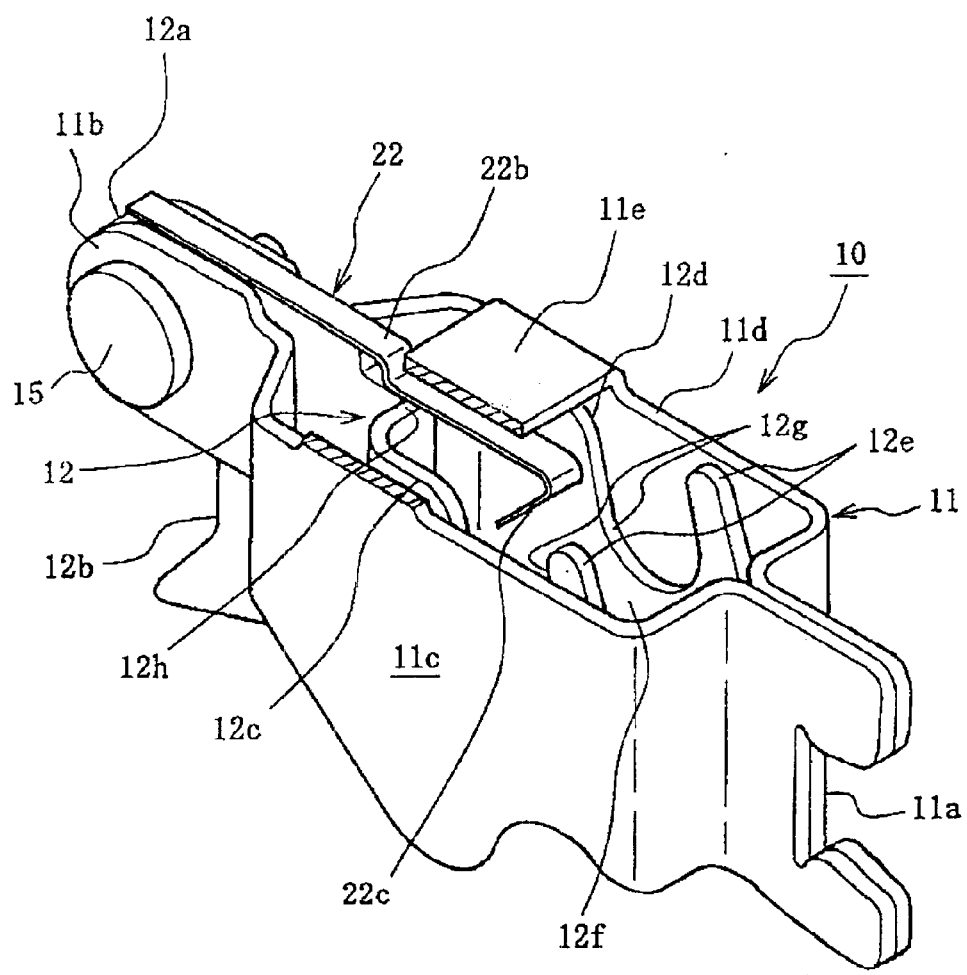
FIG. 3 is a perspective view illustrating the brake-actuating mechanism.

A drum brake-actuating mechanism 10 with a brake cable-connecting apparatus according to first embodiment is illustrated in FIGS. 1–3. The drum brake-actuating mechanism 10 mainly includes a strut 11 and an operating lever 12.

As shown in FIGS. 1 and 2, the strut 11 is disposed so as to extend between respective operating ends of brake shoes 13, 14. A brake shoe engagement groove 11a is formed at one end of the strut 11 so as to be engaged with one brake shoe 13.

A base end 12a of the operating lever 12 is pivotally attached to the other end 11b of the strut 11 by means of a pivot pin 15. A brake shoe engagement groove 12b of the operating lever 12 is formed adjacent to such a pivotal attachment portion so as to be engaged with the other brake shoe 14.

The strut 11 is formed as a rectangular frame body by bending a piece of plate. The rectangular frame body includes a pair of opposed sidewalls 11c, 11d closely superposed by means of spot welding at one end 11a of the strut 11 where the groove 11a is formed, but spaced apart from each other at the other end 11b of the strut 11 so as to sandwich the proximal end 12a of the operating lever 12 between the sidewalls 11c, 11d. The sidewalls 11c, 11d are spaced apart from each other between both ends 11a, 11b of the strut 11 by a distance therebetween greater than that at the other end 11b of the strut 11, but are connected together through a bridge portion 11e that spans between the sidewalls 11c, 11d.

The operating lever 12 includes a pair of opposed planar members 12c, 12d closely superposed by mean of spot welding at the base end 12a, but spaced apart from each other at free ends 12e of the operating lever 12 so as to form forked legs with a space 12f as shown in FIG. 1. The free ends 12e are interposed between the spaced-apart sidewalls 11c, 11d.

As described below, a width of the space 12f at the free ends 12e, i.e., a distance between the planar members 12c, 12d at the free ends 12e, is defined by a shape of an cable end 16a of a brake cable 16, which cable end 16a is connected to the free ends 12e. A shape of the cable end 16a will now be described. The cable end 16a forms a cylindrical shape having longitudinal dimension thereof greater than a diameter thereof, and assumes a rectangular shape as shown in FIG. 1 when viewed in a longitudinal direction of the brake cable 16.

The width of the space 12f is smaller than the longitudinal dimension of the cable end 16a, but is greater than the diameter of the cable end 16a. As shown in FIG. 1, such a construction allows the cable end 16a to be engaged with the free ends 12e in a cable operating direction.

Furthermore, the planar members 12c, 12d have respective cable end engagement recesses 12g formed at the free ends 12e so as to be engaged with the elongated cylindrical cable end 16a. Each of the cable end engagement recesses 12g has a bottom surface curved into an arcuate engagement surface in accordance with a circumferential curvature of the cable end 16a.

As shown in FIG. 1, a shoe return spring 17 is provided to stretch between the respective operating ends of the brake shoes 13, 14. A anchor block 18 is positioned in contact with the both brake shoes 13, 14 adjacent to the operating ends thereof. As shown in FIG. 2, the anchor block 18 is secured together with a back plate 19 to a non-rotatable vehicular portion such as a knuckle via a spacer 21 by means of a pair of bolts 20. The brake-actuating mechanism 10 is disposed on heads 20a of the bolts 20.

In the above construction, when a cable-pulling force indicated by arrow "W" in FIG. 2 is applied on the operating lever 12 via the brake cable 16, then the operating lever 12 is rotated in a counterclockwise direction in FIG. 2 about the pivot pin 15, thereby thrusting the brake shoe 14 rightward.

At the same time, such pivotal movement of the operating lever 12 imparts a counteracting force to the strut 11 via the pivot pin 15, thereby pushing the strut 11 together with the brake shoe 13 leftward.

The brake shoes 13, 14 move away from each other so as to be pressed against an inner circumferential surface of a brake drum (not shown), thereby providing a predetermined braking action.

In the case of the present first embodiment, a plate spring 22 as a resilient member is provided on the brake-actuating mechanism 10 in order to hold the cable end 16a on the free ends 12e (the cable end engagement recesses 12g) without disengaging of the brake cable, even when a drum brake device is transported.

The plate spring 22 has a proximal portion 22a bent into a L-shape in section. The proximal end 22a, a fitting hole thereof engaged with the pivot pin 15, is held between the sidewall 11d and the operating lever 12 (the planar member 12d). As shown in FIG. 3, an elongated plate 22b extending from the L-shaped proximal portion 22a is positioned between the bridge portion 11e and the operating lever 12 in such a manner that a planar surface of the elongated plate 22b intersects a pivotal surface of the operating lever 12.

A bent end 22c is formed at a distal end of the elongated plate 22b by bending a tip of the elongated plate 22b toward the space 12f. As shown in FIGS. 1 and 2, in order to interfere with the cable end 16a, the bent end 22c extends into a path in which the cable end 16a moves for engagement with and disengagement from the cable end engagement recesses 12g.

When the cable end 16a moves on the path for engaging with and disengaging from the cable end engagement recesses 12g i.e., when the cable end 16a moved in cable operating and releasing directions, then the bent end 22c interferes with the cable end 16a, and the elongated plate 22b is thereby resiliently deformed in a thickness direction thereof.

The bridge portion 11e is disposed in the immediate vicinity of the bent end 22c in order to restrict the resilient deformation of the elongated plate 22b in the thickness direction thereof when the cable end 16a is detached from the cable end engagement recesses 12g.

A proximal portion 12h of the forked leg of the free ends 12, relatively distant from the bent end 22c, supports the elongated plate 22b in order to allow the resilient deformation of the elongated plate 22b in the thickness direction thereof when the cable end 16a is attached to the cable end engagement recesses 12g.

In other words, when the cable end 16a is disengaged from the cable end engagement recesses 12g, a starting point of the resilient deformation of the plate spring 22 is supplied adjacent to the bent end 22c by the bridge portion 11e, while when the cable end 16a is engaged with the cable end engagement recess 12g, a starting point of the resilient deformation of the plate spring 22 is supplied relatively distant from the bent end 22c by the proximal portion 12h of the free ends 12.

As shown in FIGS. 1 and 2, the L-shaped proximal portion 22a extends adjacent to a stepped portion 12i of the planar member 12d so as to prevent a large pivotal movement of the plate spring 22 with respect to the operating lever 12 by abutting a tip 22d of the L-shaped proximal portion 22a against the stepped portion 12i.

When the cable end 16a is inserted into the drum brake-operating mechanism 10, which is structured as previously described, from the outside through a guide pipe as shown in FIG. 2 in order to engage the cable end 16a with the operating lever 12 (the cable end engagement recesses 12g), the cable end 16a oriented in a direction in which a longitudinal direction of the cable end 16a is positioned parallel to the planar members 12c, 12d as shown in FIGS. 4a and 4b is inserted through the space 12f in a cable releasing direction indicated as arrow in FIG. 4b.

At this time, if the cable end 16a may abut against the operating lever 12, the bridge portion 11e blocks pivotal movement of the lever 12 in a corresponding direction, and improved operability is thereby provided.

Figure 4:
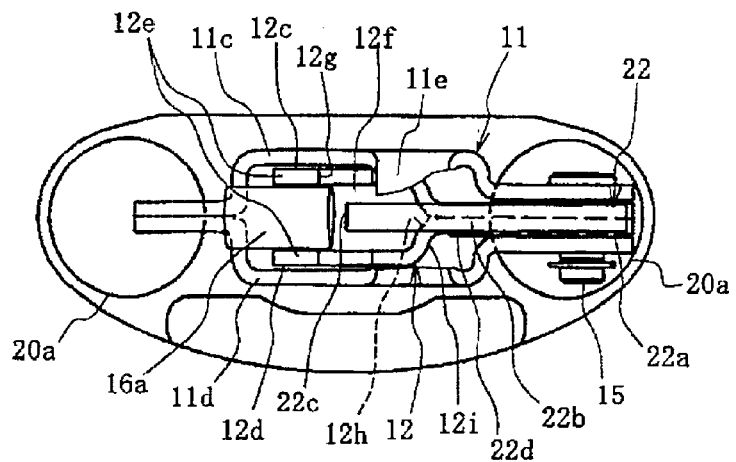
Figure 4:
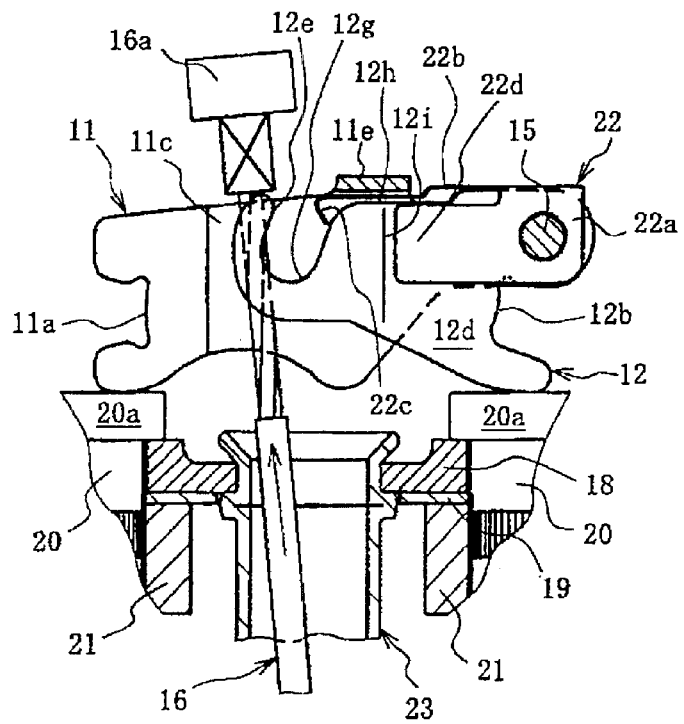
Figure 5:
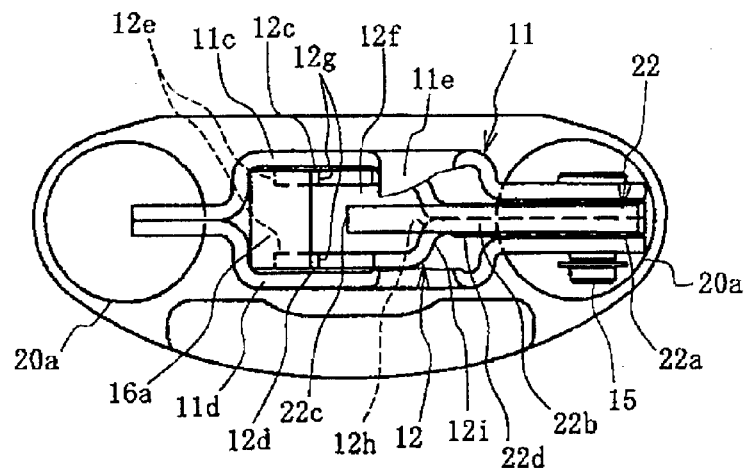
Figure 5:
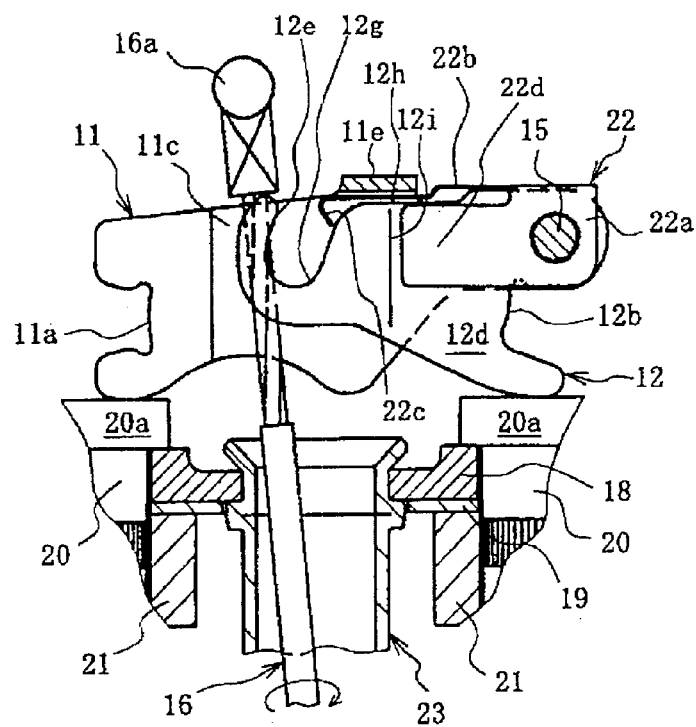

FIG. 4 illustrates the situation that an insertion of the cable end 16a through the space 12f is just completed. As shown in FIGS. 5a and 5b, the brake cable 16 is rotated 90 degrees about a longitudinal axis thereof in order to rotate the cable end 16a to a position at which the longitudinal direction of the cable end 16a is perpendicular to the planar members 12c, 12d.

Figure 6:
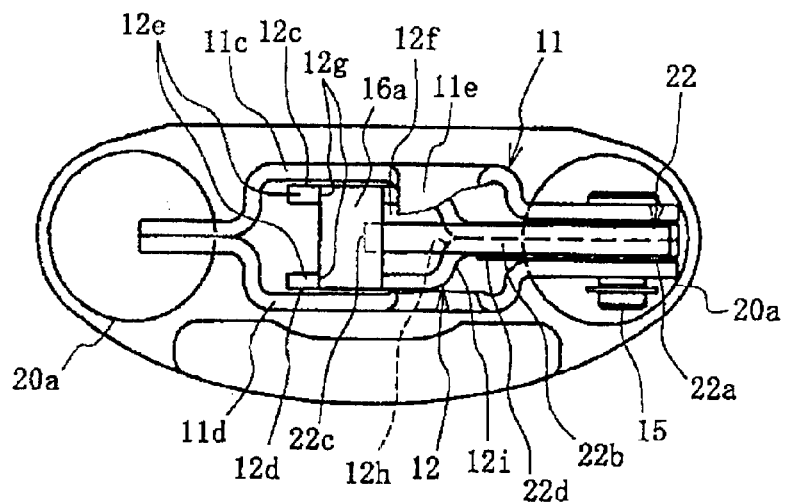
Figure 6:
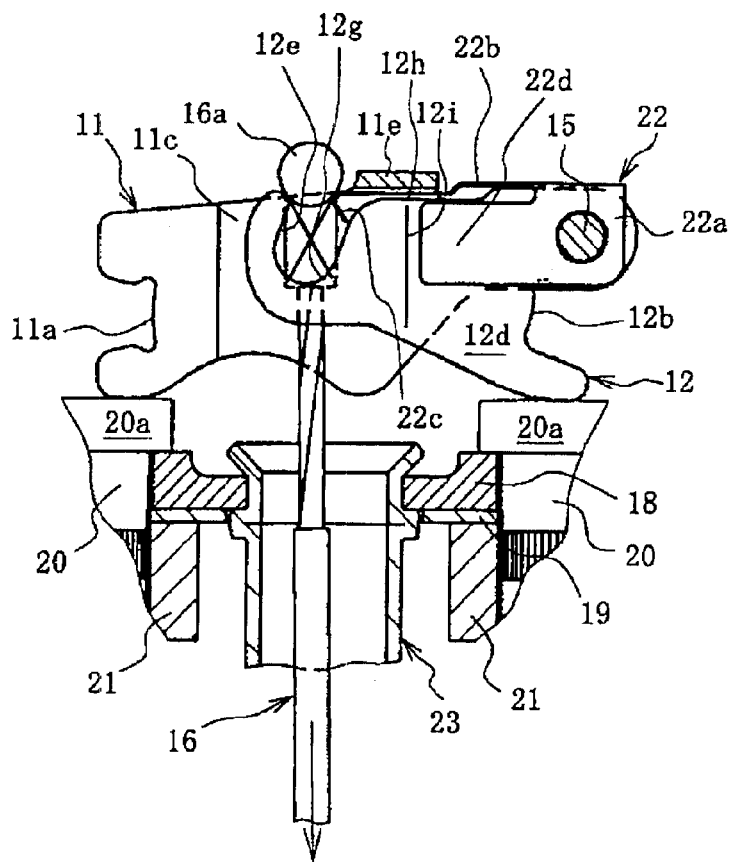
Figure 7:
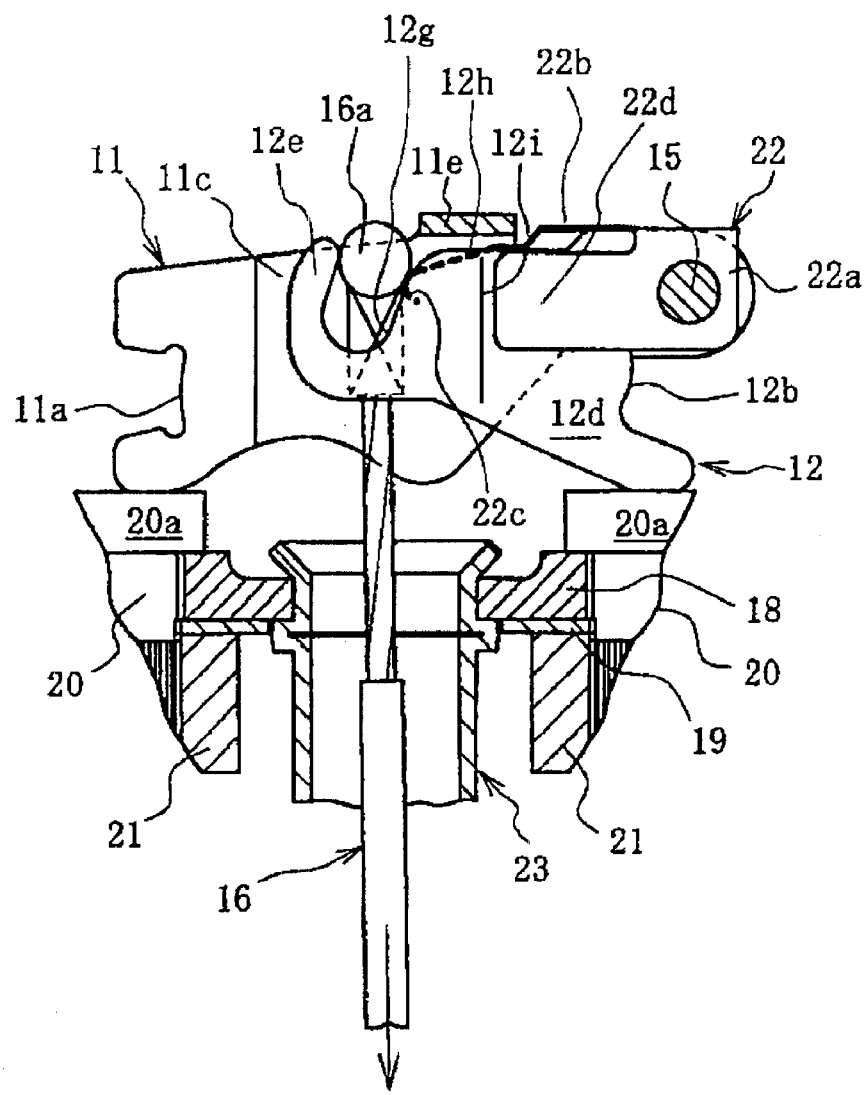
FIG. 7 is a longitudinal sectional view illustrating the progress of the connecting the brake cable to the brake-actuating mechanism in the situation that the brake cable just before engaging the brake cable with free ends of the operating lever.

As shown in FIGS. 6a and 6b, the brake cable 16 is pulled in the cable operating direction so as to abut the cable end 16a against the bent end 22c. As shown in FIG. 7, the brake cable 16 is further pulled in the cable operating direction with light force.

At this time, as shown in FIG. 7, the cable end 16a interferes with the bent end 22c, thereby resiliently deforming the elongated plate 22b in the thickness direction thereof.

The elongated plate 22b is supported by the proximal portion 12h of the forked leg of the free ends 12e, this supporting point becomes thereby a starting point of the resilient deformation. In addition, the proximal portion 12 is relatively distant from the bent end 22c. As a consequence, the elongated plate 22b can be resiliently deformed with light force.

As shown in FIGS. 1 and 2, the cable end 16a can ultimately be engaged with the cable end engagement recesses 12g, while the elongated plate 22b is sprung back to an initial position as shown in FIGS. 1 and 2, with the result that the bent end 22c again extends into the path in which the cable end 16a is moved.

As illustrated by a double-dashed chain line in FIG. 2, when the cable end 16a moves in the cable releasing direction for disengagement from the cable end engagement recesses 12g after the connection of brake cable 16 to the operating lever 12, the cable end 16a again abuts against the bent end 22c so as to resiliently deform the elongated plate 22b in the thickness direction thereof.

However, the bridge portion 11e located adjacent to the bent end 22c intercepts further resilient deformation of the elongated plate 22b, and the bent end 22c is retained in the initial position substantially as shown in FIGS. 1 and 2.

As a result, the cable end 16a can be held in engagement with the cable end engagement recesses 12g, even during transportation of the drum brake device because the cable end 16a is precluded from moving in the cable releasing direction over the cable end 16a abutting position against the bent end 22c as designated by the double-dashed chain line in FIG. 2.

In the case of the present first embodiment, as shown in FIGS. 1 and 2, the L-shaped proximal portion 22a supportingly engaged with the pivot pin 15 extends adjacent to the stepped portion 12i of the operating lever 12 so as to prevent a large pivotal movement of the plate spring 22 respect to the operating lever 12 by abutting the tip 22d of the L-shaped proximal portion 22a against the stepped portion 12i. As a result, the plate spring 22 reliably follows the operating lever 12, even on a brake operating mode in the situation that the operating lever 12 is pivoted with cable-pulling force indicated by "W" in FIG. 2, and the bent end 22c is able to hold the cable end 16a in position. This feature allows the cable end 16a to be held in engagement with the cable end engagement recesses 12g, even when the brake cable 16 urges to return to its initial position earlier than the operating lever 12 in response to releasing of cable-pulling force "W" from the brake operating mode.

In order to avoid disengaging the cable end 16a from the cable end engagement recesses 12g during transportation of the drum brake device, the present first embodiment provides the plate spring 22 that extends into the path in which the cable end 16a moves for connecting the brake cable 16 to the operating lever 12, so as to interfere with the cable end 16a. The plate spring 22 is disposed so as to be resiliently deformed in the thickness direction thereof by the cable end 16a that moves through the path in the cable operating and releasing directions. The starting point of the resilient deformation of the plate spring 22 in the cable operating direction is defined as a point where the cable end 16a can pass through the path in the cable operating direction, or the proximal portion 12h of the forked leg of the free ends 12e, when the cable end 16a moves, while the starting point of the resilient deformation of the plate spring 22 is defined as a point where the cable end 16a can not pass through the path in the cable releasing direction. The use of the above-described plate spring 22 holds the cable end 16a in reliable engagement with the cable end engagement recesses 12g with little increase in effort required for holding the cable end 16a with the free ends 12e of the operating lever (the cable end engagement recesses 12g), without a sacrifice of cable-connecting operability, and without damage or deformation of the cable end 16a and the cable end engagement recesses 12g.

The above effects and operation are obtainable by the plate spring 22 having a simple and low cost structure such that the plate spring 22 can simply be attached to the brake-actuating mechanism 10. In addition, even when the plate spring 22 is mounted in advance, the cable end 16a can be engaged with the cable end engagement recesses 12g. This is more efficient in assembly than a step in which the component for holding the cable end 16a in engagement with the operating lever 12 is mounted after the cable end 16a is attached on the cable end engagement recesses 12g.

Since the plate spring 22 is supportingly mounted on the pivot pin 15 that is used to pivotably attach the operating lever 12 to the strut 11, the plate spring 22 can simply be mounted at low cost.

The starting point of the resilient deformation of the plate spring 22 in the cable releasing direction is refined by the bridge portion 11e when the cable end 16a moves in the cable releasing direction, while the starting point of the resilient deformation of the plate spring 22 in the cable operating direction is defined by the proximal portion 12h of the forked leg of the operating lever 12 when the cable end 16a is moved in the cable operating direction. This means that the plate spring 22 is resiliently deformed from respective positions of the existing strut 11 and operating lever 12. This feature eliminates the need for additional components, which otherwise would add to the overall costs.

Figure 8:
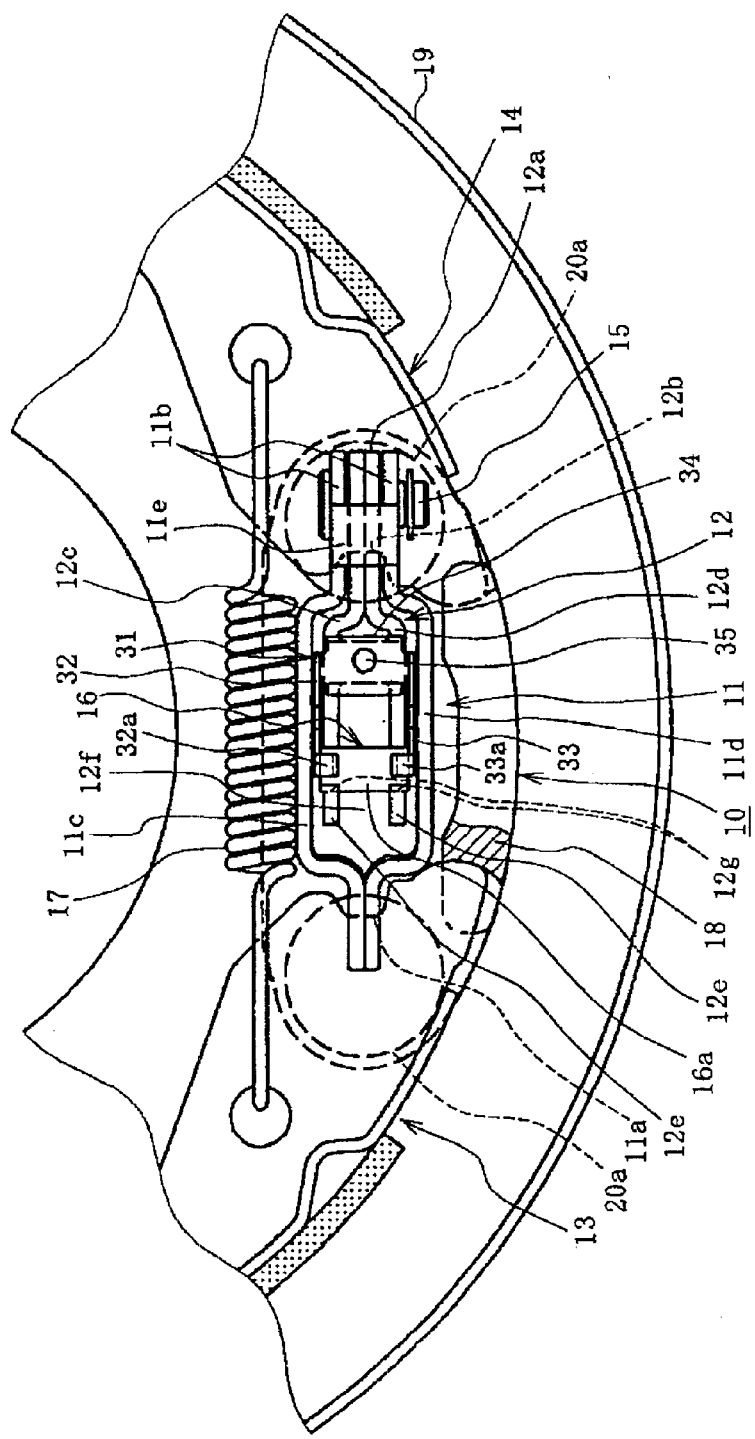
FIG. 8 is a plan view illustrating an essential part of a drum brake device including a brake cable-connecting apparatus of a brake-actuating mechanism according to second embodiment of the present invention.
Figure 9:
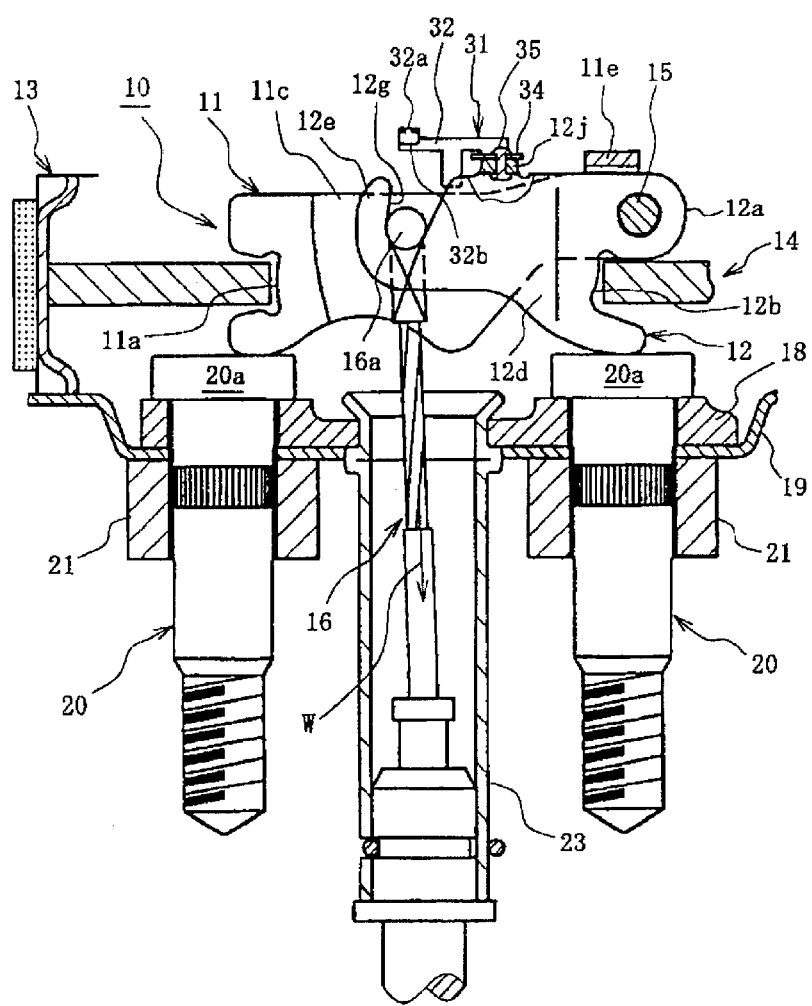
FIG. 9 is a longitudinal sectional view of FIG. 8.

A drum brake-actuating mechanism 10 for a brake cable-connecting apparatus according to second embodiment is illustrated in FIGS. 8 and 9. In FIGS. 8 and 9, the same reference numerals are hereinafter provided for members identical in function to those described in the previous first embodiment as illustrated in FIGS. 1–7.

In the second embodiment, a plate spring unit 31 is substituted for the plate spring 22 shown in FIGS. 1–7.

The plate spring unit 31 includes a pair of parallel spaced-apart plate springs 32, 33 and a proximal portion 34, in which one of adjacent ends of the plate springs 32, 33 are joined integrally to the proximal portion 34. The plate spring unit 31 is preferably made of one-piece spring steel by bending.

The proximal portion 34, including an opening 34a, is mounted on a bridge portion 12j between the planar members 12c, 12d of the operating lever 12 by a rivet 35 being penetrated through the opening 34a as shown in FIGS. 8 and 9.

As shown in FIG. 8, the plate spring unit 31 is mounted in such a manner that respective planar surfaces of the plate springs 32, 33 are positioned parallel to a pivotal surface of the operating lever 12 and extend along outer side surfaces of the planar members 12c, 12d at a tip side thereof.

Figure 10:
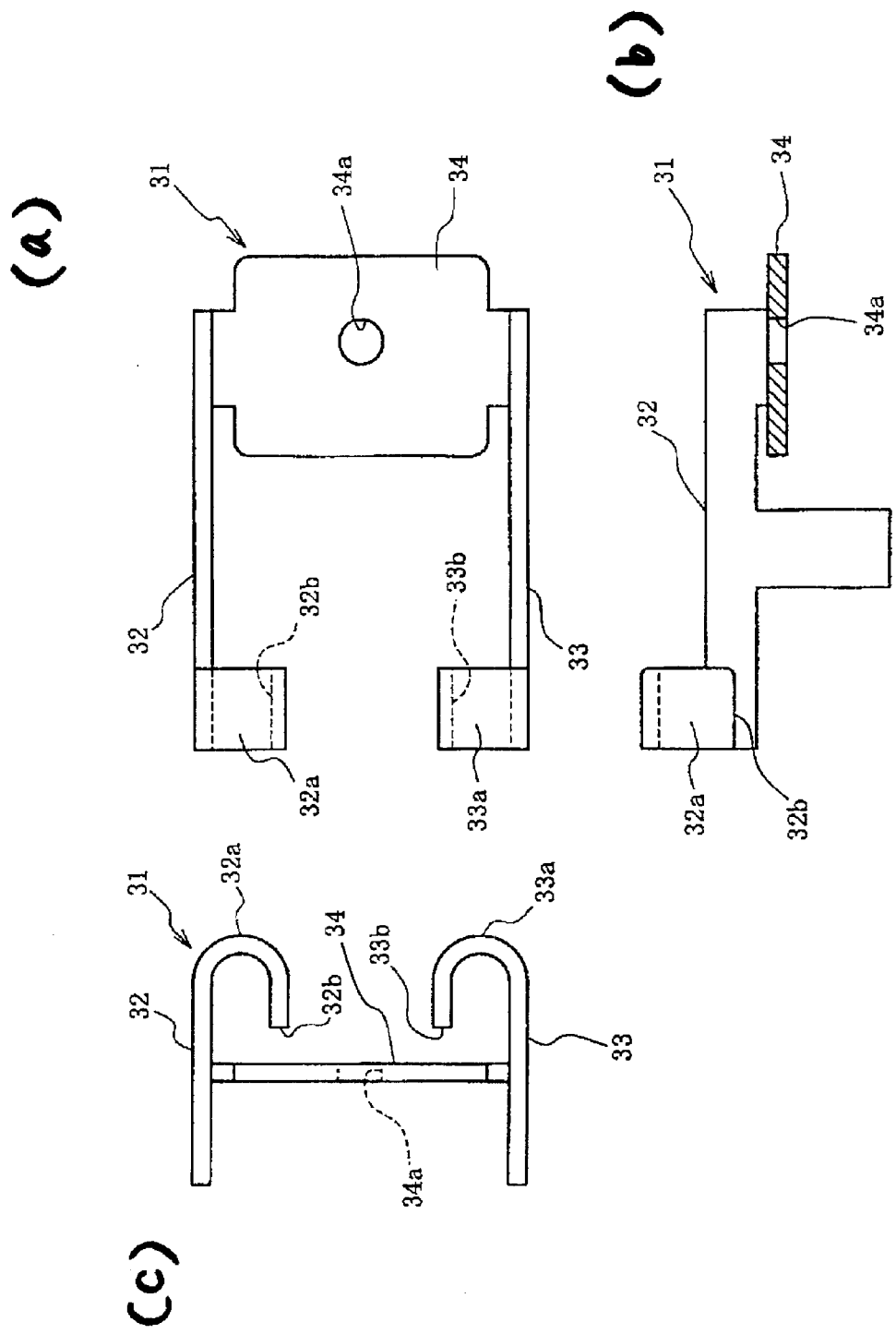

As shown in FIGS. 8–10, the plate springs 32, 33 have free ends 32a, 33a bent so as to provide operation and effects as mentioned below.

The free ends 32a, 33a are bent in a direction toward each other so as to extend into a path in which the cable end 16a moves for engagement with and disengagement from the cable end engagement recesses 12g.

The free ends 32a, 33a are bent into a shape such that, when the cable end 16a passes through the path in a cable operating direction indicated by "W" in FIG. 9 in order to be inserted into the cable end engagement recesses 12g, then the bent free ends 32a, 33a are pushed away from each other by corresponding end surfaces of the cable end 16a, with the result that the plate springs 32, 33 are resiliently deformed in a thickness direction away from each other.

Meanwhile, the free ends 32a, 33a is bent into a shape such that both ends of the cable end 16a abut against tips 32b, 33b of the free ends 32a, 33a, thereby causing forces acting in a transverse direction of the plate springs 32, 33 to be exerted on the corresponding plate springs 32, 33 when the cable end 16a moves in the path in a cable releasing direction for disengagement from the cable end engagement recesses 12g.

Figure 11:
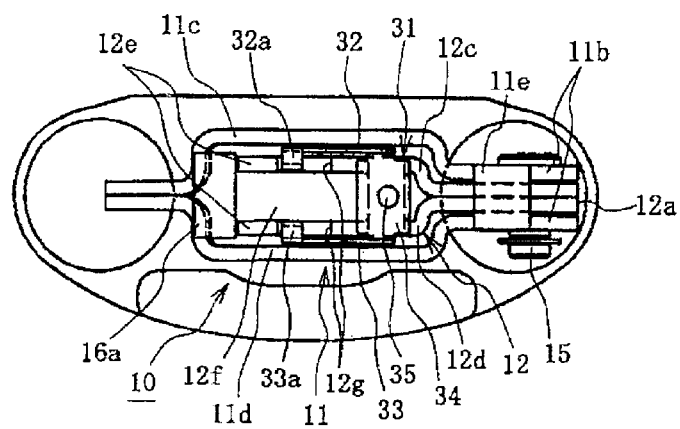
Figure 11:
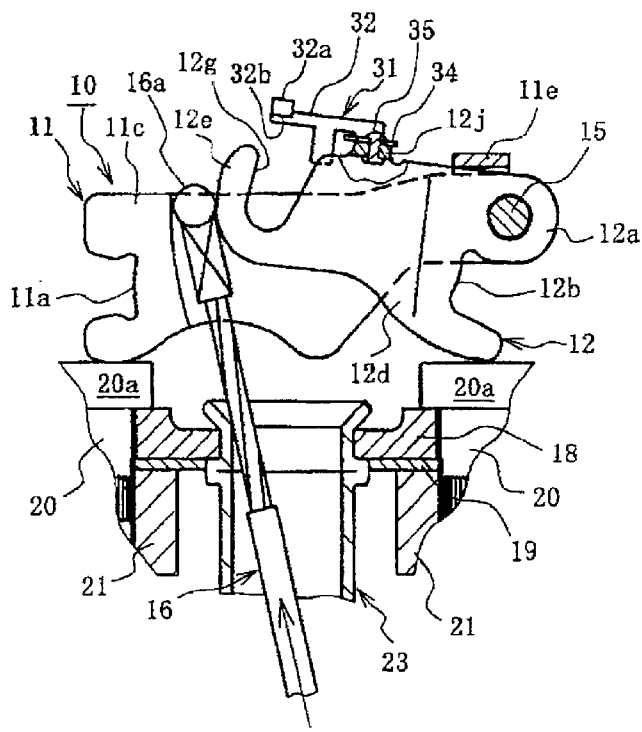

In order to insert the cable end 16a into the brake-actuating mechanism 10 according to the second embodiment from the outside through a guide pipe 23 as shown in FIG. 9, and then to engage the cable end 16a with the operating lever 12 (the cable end engagement recesses 12g), the cable end 16a having a longitudinal direction is perpendicular to the planar members 12c, 12d as shown in FIGS. 11a and 11b is inserted through a space between tips of the free ends 12e and the strut 11 in the cable operating direction indicated by an arrow in FIG. 11b.

At this time, the cable end 16a may impinge on the free ends 12e, but the bridge portion 11e between the opposed sidewalls 11c, 11d blocks pivotal movement of the operating lever 12 in a corresponding direction, and improved operability is achievable.

Figure 12:
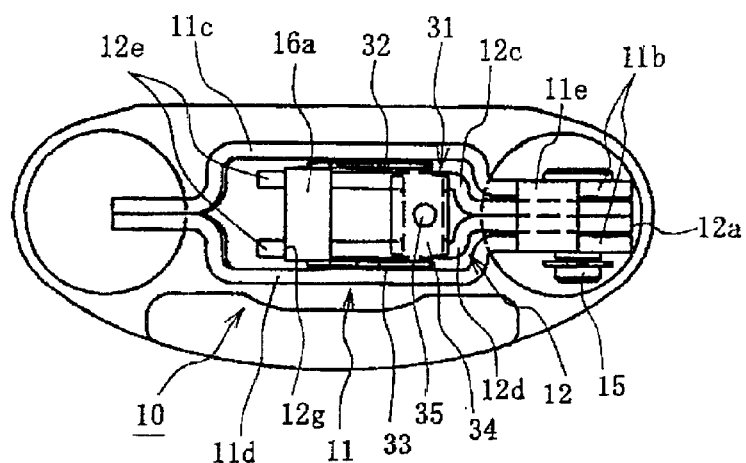
Figure 12:
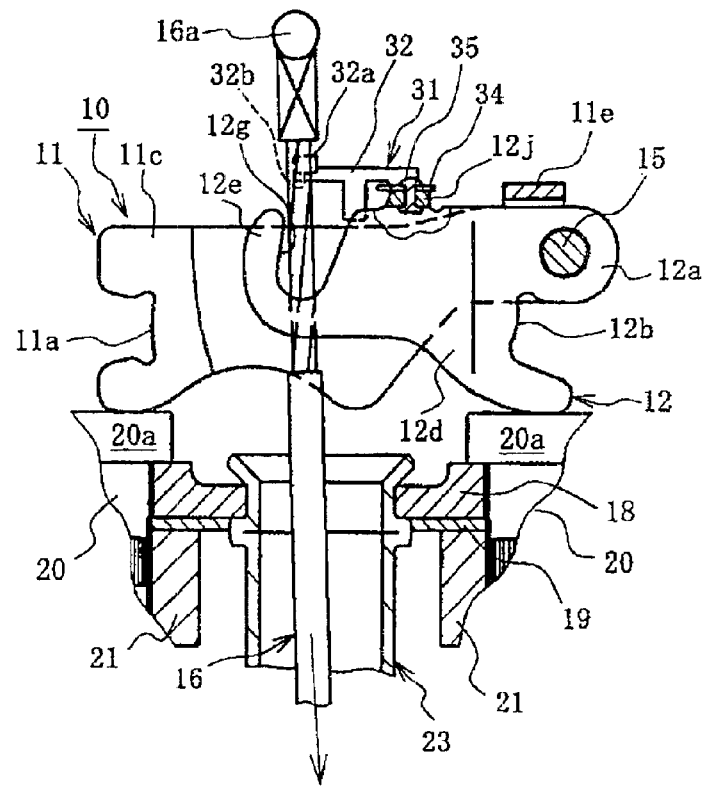

FIGS. 12a and 12b show the situation that the insertion of the cable end 16a in the cable releasing direction is just completed. In this state, the brake cable 16 is pulled in the cable operating direction indicated by an arrow in FIG. 12b, thereby moving the cable end 16a toward the cable end engagement recesses 12g.

Figure 13:
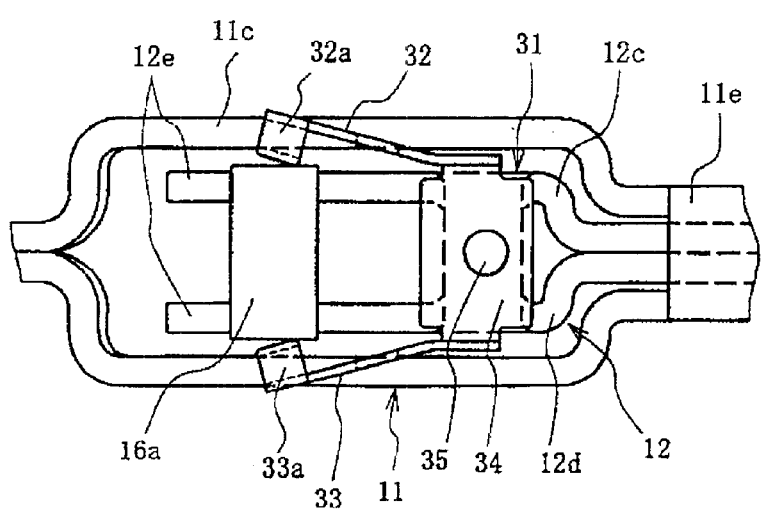
Figure 13:
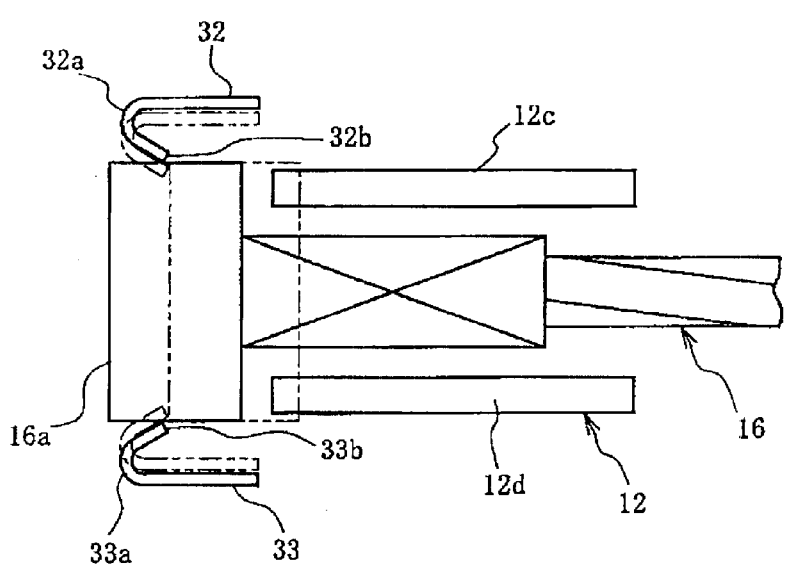
Figure 14:
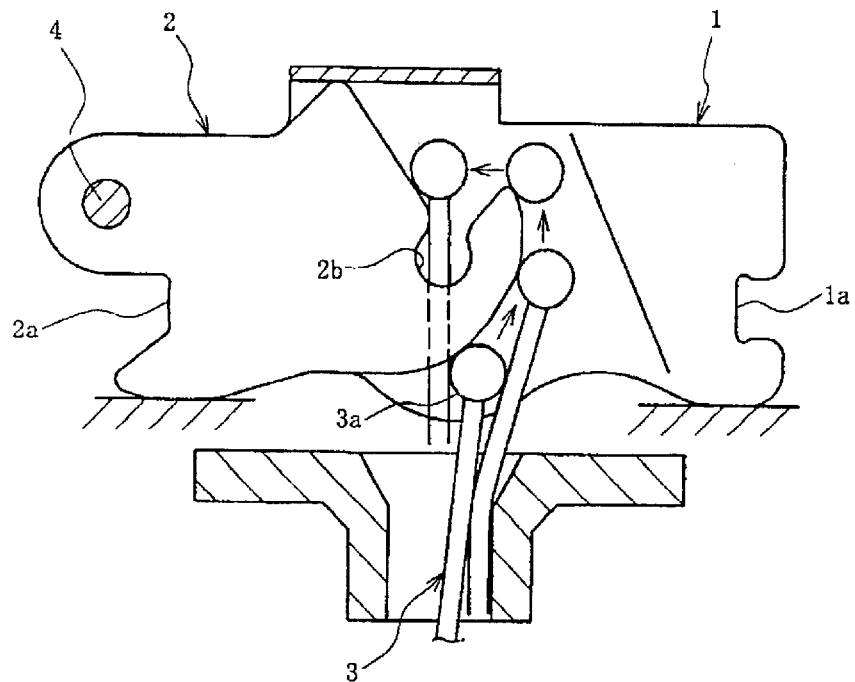
FIG. 14a is a longitudinal sectional view illustrating a progress of the connecting the brake cable to the brake-actuating mechanism with a prior art brake cable-connecting apparatus in the situation that the brake cable is inserted; and, FIG. 14b is a longitudinal sectional view illustrating the brake-actuating mechanism in which the inserted brake cable is in the process of being pulled in the operative direction.
Figure 14:
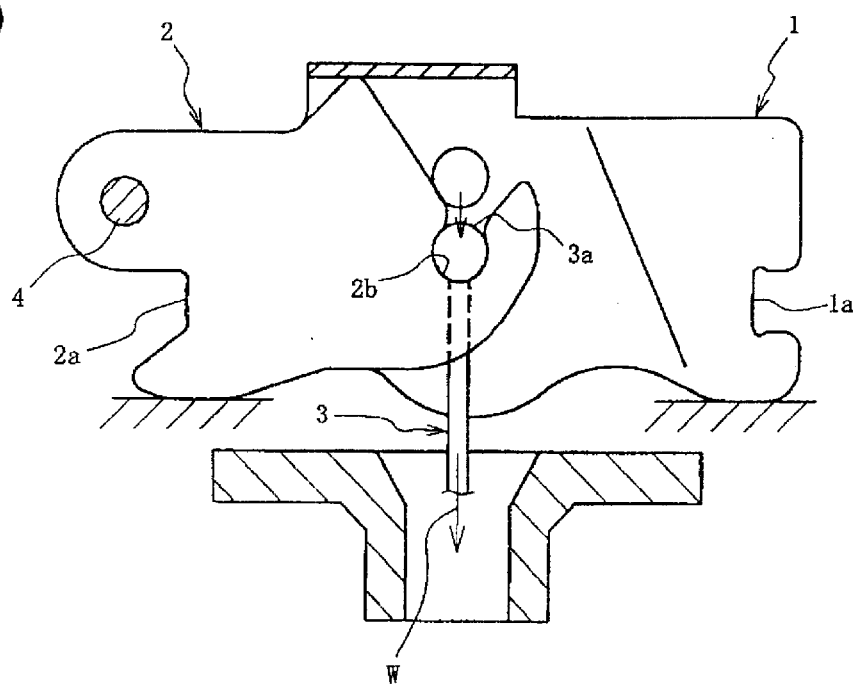

As shown in FIGS. 13a and 13b, the cable end 16a enters between the bent free ends 32a, 33a; both end surfaces of the cable end 16a thrust the free ends 32a, 33a away from each other. The cable end 16a can ultimately be inserted into the cable end engagement recesses 12g for engagement therewith.

The above operation is achievable by a small force because the plate springs 32, 33 are resiliently deformed in the thickness direction thereof as shown in FIGS. 13a and 13b.

When the cable connection is completed, then the plate springs 32, 33 are sprung back to respective initial positions as shown in FIGS. 8 and 9, and the bent free ends 32a, 33a again extend into the path in which the cable end 16a moves.

In this state, when the cable end 16a moves in the cable releasing direction so as to be disengaged from the cable end engagement recesses 12g, then the cable end 16a abuts against the tips 32b, 33b, as shown by double-dashed chain line in FIG. 13b, and the plate springs 32, 33 thereby experiences the forces that act in the transverse direction of the plate springs 32, 33.

However, the plate springs 32, 33 are difficult to resiliently deform, depending upon how strong the forces act in the transverse direction of the plate springs 32, 33, and the bent free ends 32a, 33a are held in the initial position as shown in FIGS. 8 and 9.

As a result, the cable end 16a is stopped from further moving in the cable releasing direction over the position at which cable end 16a impinges on the tips 32b, 33b as shown by the double-dashed chain line in FIG. 13b. This feature allows the cable end 16a to be held in engagement with the cable end engagement recesses 12g, even during transportation of the drum brake device.

In conclusion, pursuant to the present second embodiment, in order to prevent disengagement of the cable end 16a from the cable end engagement recesses 12g during transportation of the drum brake device, the pair of plate springs 32, 33 are rigidly secured to the operating lever 12 in such a manner that the respective planar surfaces of the plate springs 32, 33 are positioned parallel to the pivotal surface of the operating lever 12, and further that the plate springs 32, 33 have the respective bent portions 32a, 33a formed at the free ends thereof, which bent portions 32a, 33a are pushed away from each other by corresponding end surfaces of the cable end 16a in a pivotal axial direction of the lever 12, thereby resiliently deforming the plate springs 32, 33 in the thickness direction thereof when the cable end 16a is moved toward the cable end engagement recesses 12g in the cable operating direction. When the cable end 16a moves away from the cable end engagement recesses 12g, then both ends of the cable end 16a in the pivotal axial direction of the operating lever 12 abut against the tips 32b, 33b of the bent portion 32a, 33a so as to exert the forces in the transverse direction of the plate springs 32, 33 on the plate springs 32, 33, thereby blocking the resilient deformation of the plate springs 32, 33. The above-described construction precludes the resilient deformation of the plate springs 32, 33 when the cable end 16a is moving away from the cable end engagement recesses 12g. This means that a low cost countermeasure including the plate springs 32, 33 is possible to hold the cable end 16a in the engagement with the cable end engagement recesses 12g.

In addition, such a pair of plate springs 32, 33 prevents disengagement of the cable end 16a from the cable end engagement recesses 12g at both ends of the cable end 16a, and realizes stable engagement of the cable end 16a with the cable end engagement recesses 12.

When the cable end 16a moves in the cable operating direction, the plate springs 32, 33 are resiliently deformed in the thickness direction thereof with light force, thereby allowing the cable end 16a to continue to move. As a result, the above operation and effects in which the cable end 16a is held in position is achievable, with little increase in effort required for holding the cable end 16a in the engagement with the free ends 12e, without a sacrifice of cable-connecting workability, and without damage or deformation of the cable end 16a and cable end engagement recesses 12g.

The plate springs 32, 33 joined integrally together through the proximal portion 34 at ones of adjacent ends of the plate springs 32, 33 are rigidly secured to the operating lever 12 at the proximal portion 34. As a result, the pair of plate springs 32, 33 used as a leaf spring according to the second embodiment can easily be mounted.

While the foregoing invention has been shown and described with reference to several preferred embodiments, it will be understood by those of skill in the art that various changes in form and detail may be made therein without departing from the spirit and scope of the invention.

What we claim is:

1. A brake cable-connecting apparatus of a brake-actuating mechanism for use on a drum brake,
the brake-actuating mechanism comprising:
a strut engaging with one of a pair of brake shoes at one end thereof;
an operating lever, being pivotably attached to the strut at the other end of the strut, engaging with the other of the brake shoes at the other end thereof;
a brake cable, a cable end thereof engaging with a free end of the operating lever in a cable operating direction so as to rotate the operating lever relative to the strut with a pivotal attachment portion by applying a brake cable-pulling force on the free end of the operating lever, thereby moving the brake shoes in a direction away from each other, and a resilient member extending into a path in which the cable end moves when the cable end engages with the free end of the operating lever, said resilient member being positioned to interfere with the cable end so that the cable end can pass over the resilient member with sufficiently resilient deformation of the resilient member by the cable end when the cable end moves in the path in the cable operating direction, such that the cable end can not pass over the resilient member when the cable end moves in the path in a cable releasing direction substantially opposite to said cable operating direction.

2. A brake cable-connecting apparatus as defined in claim 1, wherein the resilient member is formed by a plate spring disposed so as to be resiliently deformed in a thickness direction of the plate spring by the cable end when the cable end runs in the path in the cable operating and releasing directions, and that the resilient deformation in the cable operating direction is designed to allow the movement of the cable end through the path in the cable operating direction and to restrict the movement in the cable releasing direction.

3. A brake cable-connecting apparatus as defined in claim 2, wherein the plate spring is supportingly mounted on a pivot pin used to pivotably attach the operating lever to the strut at the other end of the strut.

4. A brake cable-connecting apparatus as defined in claim 3, wherein the strut includes a pair of opposed sidewalls and a bridge portion that spans between the sidewalls, the free end of the operating lever being interposed between the sidewalls at both sides of the operating lever in a pivotal axial direction of the operating lever, and that the resilient deformation of the plate spring is defined by the bridge portion and is designed to restrict the movement of the cable end in the path in the cable releasing direction over resilient member.

5. A brake cable-connecting apparatus as defined in claim 3, wherein the free end of the operating lever is formed into a forked leg with which at least one end of the cable end engages in the pivotal axial direction of the operating lever, and wherein the starting point of the resilient deformation of the plate spring where the cable end can run in the path in the operating direction over resilient member is decided by a proximal portion of the forked leg.

6. A brake cable-connecting apparatus as defined in claim 1, wherein the resilient member is formed by a plate spring disposed to permit the cable end to pass over the resilient member by sufficiently resilient deformation in a thickness direction of the plate spring by the cable end when the cable end moves in the path in the cable operating direction, while preventing resilient deformation of the resilient member due to a force from the cable end in the transverse direction of the plate spring when the cable end moves in the path in the cable releasing direction.

7. A brake cable-connecting apparatus as defined in claim 6, wherein a pair of plate springs fixedly attached to the operating lever in such a manner that planar surfaces of the plate springs are positioned parallel to a pivotal surface of the operating lever, respective bent portions being provided at free ends of the plate springs, in which the bent portions are pushed away from each other by corresponding end surfaces of the cable end in the pivotal axial direction of the operating lever when the cable end moves in the path in the cable operating direction, thereby resiliently deforming the plate springs in the thickness direction of the plate springs, while at least one end of the cable end in the pivotal axial direction of the operating lever abuts against tips of the bent portions so as to cause forces acting in the transverse direction of the plate springs to be actuated on the plate springs when the cable end moves in the path in the cable releasing direction, thereby precluding resilient deformation of the plate springs.

8. A brake cable-connecting apparatus as defined in claim 7, wherein the plate springs are integrally formed with a connecting portion and mounted on the operating lever at the connecting portion.

9. A brake cable-connecting apparatus as defined in claim 4, wherein the free end of the operating lever is formed into a forked leg with at least one end of the cable end engages in the pivotal axial direction of the operating lever, and wherein the starting point of the resilient deformation of the plate spring where the cable end can run in the path in the operating direction over resilient member is decided by a proximal portion of the forked leg.

10. A brake cable-connecting apparatus of a brake-actuating mechanism for use on a drum brake, the brake-actuating mechanism comprising:

a strut engaging with a first brake shoe at a first end thereof;

an operating lever, being pivotably attached to the strut at a second end of the strut, engaging with a second brake shoe;

a brake cable, a cable end thereof engaging with a free end of the operating lever when said cable is tensioned in a cable operating direction so as to rotate the operating lever relative to the strut by actuating the brake cable at the free end of the operating lever, thereby moving the brake shoes in a direction away from each other, and a resilient member disposed adjacent said free end, said resilient member bending in a first direction when the cable end moves along the cable operating direction to permit the cable end to engage the free end of the operating lever, said resilient member blocked from bending is a second direction opposite said first direction when the cable end moves along a cable releasing direction substantially opposite to said cable operating direction, thereby preventing the cable end from dislodging from said free end.

11. A brake cable-connecting apparatus as defined in claim 10, wherein the resilient member is formed by a plate spring disposed so as to be resiliently deformed along a path defined by said cable operating direction.

12. A brake cable-connecting apparatus as defined in claim 11, wherein the plate spring is supportingly mounted on a pivot pin pivotably attaching the operating lever to the strut.

13. A brake cable-connecting apparatus as defined in claim 10, wherein the strut includes a pair of opposed sidewalls and a bridge portion that spans between the sidewalls, the free end of the operating lever being interposed between the sidewalls at both sides of the operating lever in a pivotal axial direction of the operating lever, and wherein bridge portion blocks resilient deformation of the plate spring in said second direction.

14. A brake cable-connecting apparatus as defined in claim 10, wherein the free end of the operating lever is formed into a forked leg wherein an end of the cable end engages with the forked leg.

* * * * *

UNITED STATES PATENT AND TRADEMARK OFFICE
CERTIFICATE OF CORRECTION

PATENT NO. : 6,435,317 B2 Page 1 of 1
DATED : August 20, 2002
INVENTOR(S) : Tanaka et al.

It is certified that error appears in the above-identified patent and that said Letters Patent is hereby corrected as shown below:

<u>Title page,</u>
Item [30], please add the Foreign Priority information as follows:

-- [30] Foreign Application Priority Data
July 17, 2000   (JP)………………………..2000-215341 --

Signed and Sealed this

Twenty-fifth Day of March, 2003

JAMES E. ROGAN
*Director of the United States Patent and Trademark Office*